US011223485B2

(12) United States Patent
Wu et al.

(10) Patent No.: US 11,223,485 B2
(45) Date of Patent: Jan. 11, 2022

(54) VERIFIABLE ENCRYPTION BASED ON TRUSTED EXECUTION ENVIRONMENT

(71) Applicant: Huawei Technologies Co., Ltd., Shenzhen (CN)

(72) Inventors: Teng Wu, Waterloo (CA); Yin Tan, Waterloo (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 332 days.

(21) Appl. No.: 16/037,789

(22) Filed: Jul. 17, 2018

(65) Prior Publication Data

US 2020/0028693 A1  Jan. 23, 2020

(51) Int. Cl.
*H04L 9/32* (2006.01)
*G06F 21/57* (2013.01)
(Continued)

(52) U.S. Cl.
CPC ............ *H04L 9/3252* (2013.01); *G06F 21/57* (2013.01); *G09C 5/00* (2013.01); *H04L 9/0825* (2013.01);
(Continued)

(58) Field of Classification Search
CPC ... H04L 9/3252; H04L 9/3263; H04L 9/0825; H04L 9/3066; H04L 9/0894; H04L 9/14;
(Continued)

(56) References Cited

U.S. PATENT DOCUMENTS 8,108,678 B1 * 1/2012 Boyen .................. H04L 9/0847
713/176
2008/0270790 A1  10/2008 Brickell et al.
(Continued)

FOREIGN PATENT DOCUMENTS

CN    107005577 A    8/2017
CN    107851150 A    3/2018
(Continued)

OTHER PUBLICATIONS

Christopher Carr et al. ,Zero-Knowledge Proof of Decryption for FHE Ciphertexts, 2018,IACR (Year: 2018).*
(Continued)

*Primary Examiner* — Saleh Najjar
*Assistant Examiner* — Khalid M Almaghayreh
(74) *Attorney, Agent, or Firm* — Slater Matsil, LLP

(57) ABSTRACT

A method for verifying a property of plaintext using ciphertext is disclosed. In an embodiment, a computing device may receive the ciphertext at a trusted execution environment (TEE) of the computing device. The TEE may decrypt the ciphertext to generate the plaintext using a private encryption key of an encryption key pair. The encryption key pair comprises a public encryption key and the private encryption key. The TEE may generate a digitally signed validation result by encrypting the validation result using a private signing key of a signing key pair. The signing key pair comprises a public signing key and the private signing key. The private key is retrieved from secure memory of the computing device, and the secure memory may only be accessible by the TEE. The computing device may then transmit the digitally signed validation result.

19 Claims, 7 Drawing Sheets

(51) Int. Cl.
*H04L 9/08* (2006.01)
*H04L 9/30* (2006.01)
*G09C 5/00* (2006.01)
*H04L 9/14* (2006.01)
*H04L 9/00* (2006.01)

(52) U.S. Cl.
CPC .......... *H04L 9/0894* (2013.01); *H04L 9/3066* (2013.01); *H04L 9/3263* (2013.01); *H04L 9/006* (2013.01); *H04L 9/14* (2013.01)

(58) Field of Classification Search
CPC ....... H04L 9/006; H04L 9/008; H04L 9/3218; H04L 2209/38; H04L 9/3239; H04L 9/0897; G06F 21/57; G06F 2221/2107; G06F 2221/2101; G09C 5/00
USPC .... 713/155, 156, 171, 173, 175, 176; 726/3, 726/4, 10
See application file for complete search history.

(56) References Cited

U.S. PATENT DOCUMENTS

| | | | | |
|---|---|---|---|---|
| 2012/0023568 A1* | 1/2012 | Cha | ....................... | G06F 21/335 726/10 |
| 2015/0074764 A1* | 3/2015 | Stern | ..................... | H04L 9/3247 726/4 |
| 2016/0119291 A1* | 4/2016 | Zollinger | .............. | H04L 9/3228 713/171 |
| 2016/0254904 A1* | 9/2016 | Hjelm | ..................... | H04L 9/006 713/155 |
| 2016/0254918 A1* | 9/2016 | Liu | ..................... | H04L 63/0823 713/156 |
| 2016/0358165 A1* | 12/2016 | Maxwell | ............... | H04L 9/3239 |
| 2017/0103378 A1* | 4/2017 | Pan | .................... | G06Q 20/3829 |
| 2017/0324563 A1* | 11/2017 | Isshiki | .................. | H04L 9/3247 |
| 2018/0219688 A1* | 8/2018 | Zhu | ....................... | H04L 9/0825 |
| 2018/0309574 A1* | 10/2018 | Lyubashevsky | ...... | H04L 9/3093 |
| 2018/0329783 A1 | 11/2018 | Karame et al. | | |
| 2019/0068358 A1* | 2/2019 | Gutschow | ............. | G06F 16/245 |
| 2019/0068376 A1* | 2/2019 | Kong | ..................... | H04L 63/12 |
| 2019/0156038 A1* | 5/2019 | Pappachan | ............. | G06F 21/57 |
| 2019/0327077 A1* | 10/2019 | Mandal | ................... | H04L 9/008 |
| 2019/0363870 A1* | 11/2019 | Wagner | ............... | G06Q 20/401 |

FOREIGN PATENT DOCUMENTS

| | | |
|---|---|---|
| EP | 2759955 A1 | 7/2014 |
| EP | 3281115 A1 | 2/2018 |
| WO | 2014196966 A1 | 12/2014 |
| WO | 2017186317 A1 | 11/2017 |
| WO | 2018039099 A1 | 3/2018 |

OTHER PUBLICATIONS

Sama, V., "Universally Composable Zero Knowledge Protocol using Trusted Platform Modules", A Thesis Submitted to the Faculty of the Graduate School at the University of North Carolina at Greensboro in Partial Fulfillment of the Requirements for the Degree Master of Science, Greensboro, May 1, 2011, 44 Pages.

Tate, S., et al., "Efficient Verifiable Escrow and Fair Exchange with Trusted Hardware", IACR, International Association for Cryptologic Research, Proceedings of the 23rd Annual IFIP WG 11.3 Working Conference on Data and Applications Security (DBSec'09), May 29, 2013, 28 Pages.

\* cited by examiner

VERIFIABLE ENCRYPTION BASED ON TRUSTED EXECUTION ENVIRONMENT

TECHNICAL FIELD

The present invention relates generally to a system and method for encryption, and, in particular embodiments, to a system and method for verifying a property of plaintext using ciphertext.

BACKGROUND

For most encryption methods, properties of the plaintext are hard to be verified merely using the ciphertext. This problem is referred to as the Verifiable Encryption Problem (VEP).

Zero knowledge proof (ZKP) is one known solution to the VEP. However, normal ZKP is applicable to verifying one property of the plaintext and not generally applicable to verifying other properties of plaintext. This means that to prove one specific knowledge (in the VEP case, to prove some properties of the plaintext), one specific ZKP must be constructed that is tailored to solve one specific problem. Furthermore, verifying the security of the algorithm constructed by ZKP usually takes years. ZKP is also very complicated and not easy to use. Additionally, for different problems, the user has to run a computationally intensive process again to generate a new protocol.

Another solution to the VEP is a new ZKP technique called ZK-SNARK that claims that it is a general framework for all problems that can be solved by a Turing machine. However, to translate the problem to a polynomial requires intensive computational and complicated mathematical skills. Therefore, a simpler, more general, and quicker solution to the VEP is desirable.

SUMMARY

A method for verifying a property of plaintext using ciphertext is disclosed. In an embodiment, a computing device may receive the ciphertext at a trusted execution environment (TEE) of the computing device. The TEE may decrypt the ciphertext to generate the plaintext using a private encryption key of an encryption key pair. The encryption key pair comprises a public encryption key and the private encryption key. The TEE may generate a digitally signed validation result by encrypting the validation result using a private signing key of a signing key pair. The signing key pair comprises a public signing key and the private signing key. The private key is retrieved from secure memory of the computing device, and the secure memory may only be accessible by the TEE. The computing device may then transmit the digitally signed validation result.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
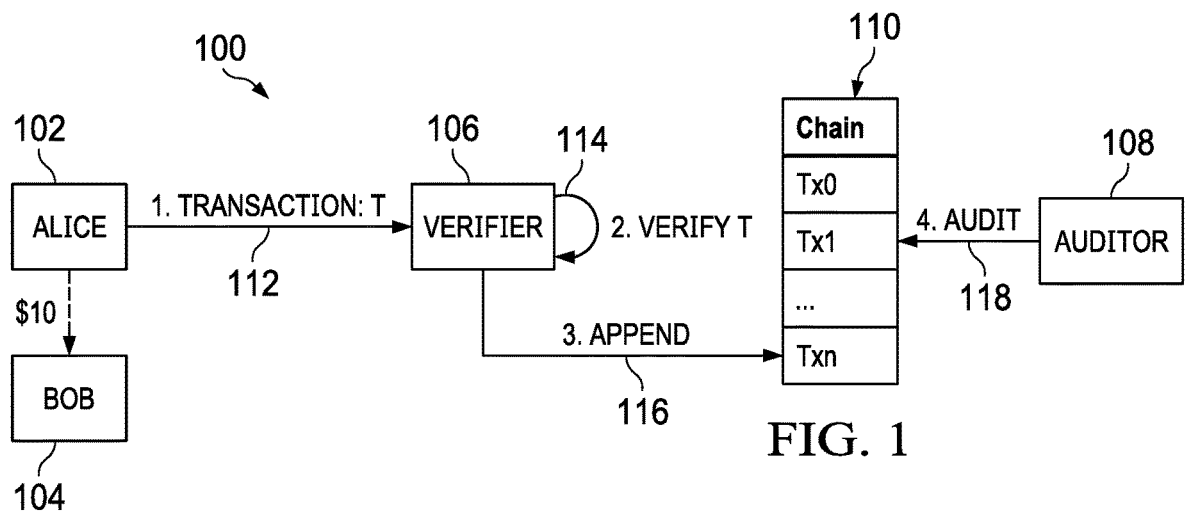
FIG. 1 is a logical block diagram of a decentralized system illustrating a scenario in which plaintext of ciphertext needs to be verified.

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

For most encryption methods, properties of plaintext are difficult to verify merely using the ciphertext generated by encrypting the plaintext using an encryption algorithm. Disclosed herein are systems and methods for verifying properties of plaintext using ciphertext generated by encrypting the plaintext using an encryption algorithm. In some embodiments, the plaintext is a numerical value, and the property of the plaintext to be verified is that the numerical value is within a range. In other embodiments, the plaintext is a string, and the property to be verified is a length of the string. In still other embodiments, the plaintext is a hash value and the property of the plaintext to be verified is that the hash value equals a certain value. The problem of verifying properties of plaintext using ciphertext is called the "verifiable encryption problem (VEP)" throughout this patent.

One example of the VEP is verifying an encrypted transaction value of a cryptocurrency transaction. Consider the following example. Alice transfers $10 of a cryptocurrency to Bob via a decentralized network in which transactions are recorded using blockchain. There are three roles in this scenario: 1) the sender Mice, 2) the receiver Bob, arid 3) the verifier. The verifier is a peer computing device on the decentralized network which verifies each cryptocurrency transaction to guarantee that the cryptocurrency transactions are valid. The transaction value in the cryptocurrency transaction is encrypted, and both Alice's and Bob's account balance is encrypted for the privacy purposes. There are two problems. How can Bob verify the transaction value is actually $10 in the transaction since it is encrypted? And how can the verifier on this network verify Alice has more than 10 of a cryptocurrency in her account? These two problems are the same, which both consider how to prove a transaction value (e.g., $10 of the cryptocurrency) is within a certain range (e.g., the property of the plaintext) using the encrypted transaction value (e.g., the ciphertext) which is included in the transaction between Alice and Bob. This problem is referred to as "Range Proof over Ciphertext (RPoC)". The RPoC is one kind of a VEP. In this disclosure, RPoC will be used as an example to explain disclosed solutions of the VEP. However, the disclosed systems and methods can be applied to any general VEP, not just to RPoC.

Disclosed herein are methods and systems to resolve the VEP by involving a Trusted Execution Environment (TEE) of a computing device. In an embodiment, a computing device may receive the ciphertext at a TEE of the computing device. The TEE may decrypt the ciphertext to generate the plaintext using a private encryption key of an encryption key pair. The encryption key pair comprises a public encryption key and the private encryption key. The TEE may generate a digitally signed validation result by encrypting the validation result using a private signing key of a signing key pair. The signing key pair comprises a public signing key and the private signing key. The private key is retrieved from secure memory of the computing device, and the secure memory may only be accessible by the TEE. The computing device may then transmit the digitally signed validation result.

Take the RPoC described above as an example. On Alice's side, a TEE of Alice's computing device includes a prover for verifying that the transaction value is within a certain range. In this example, the prover is a software code that includes programming instructions for verifying that the transaction value (e.g. $10 of a cryptocurrency) of the transaction is within a certain range and generates a validation result when the prover determines that the transaction value is within a certain range. The prover then generates a digitally signed validation result by encrypting the validation result using a private signing key of a signing key pair. The validation result proves the transaction is valid. The software code of the prover is provided by the software code provider. The verifier's computing device receives, via the decentralized network, the transaction (which includes the encrypted transaction value) and the digitally signed validation result, and verifies the digital signature of the digitally signed validation result using the public signing key in order to validate (e.g., prove) the transaction value is within a certain range. Specifically, the process has the following steps. The prover in the TEE receives Alice's private encryption key. The prover proves the plaintext has certain properties (the transaction value is $10 and Alice has more than $10 in her account balance) and digitally signs the proof using a private key of a signing key pair. The verifier verifies the digitally signed proof (i.e., the validation result) to confirm that the transaction value is $10 and Alice has more than $10.

One advantage of one or more embodiments of the present disclosure is that a property of plaintext using ciphertext can be proven without leaking any information of the private encryption key and the private signing key (e.g., Alice's private key for decrypting ciphertext to plaintext and the private key that the prover uses to digitally sign the validation result) and the plaintext. The private encryption key, the private signing key, and the plaintext are stored in secure memory that is only accessible by the TEE of Alice's computing device. No one except the owner of the data (i.e., the private encryption key, the private signing key, and the plaintext) has the knowledge about such data in the secure memory. In one aspect, the private encryption key is received by the TEE. The ciphertext is passed into the TEE and decrypted in the TEE. The properties are verified and proof of those properties is generated by the prover in the TEE. To prove the proof is generated inside the TEE, the prover digitally signs the proof using the private signing key of a signing key pair. The private signing key is stored in secure memory that is only accessible by the TEE. Note that, during the whole process, neither the private encryption key nor the plaintext is leaked outside of the TEE. Therefore, the security of the private encryption key and the plaintext is reduced to the security of the TEE. Since the private signing key is stored in secure memory that is only accessible by the TEE, the integrity of the proof is reduced to the security of the TEE as well.

Another advantage of one or more embodiments of the present disclosure is that the proof can be verified by using public information. To verify the proof, the verifier needs the publicly available information only. The proof is digitally signed by the private signing keys, which is a private key of a signing key pair, such as a PKI key pair. To verify the digital signature, the verifier only needs to know the public signing key of the signing key pair, which is the publicly known information.

Another advantage of one or more embodiments of the present disclosure is that the software code provider can prove that it has zero knowledge about sensitive information such as private encryption key, the private signing key, and the plaintext. The verification of the property of the plaintext inside the TEE is the only process that may leak the sensitive information. The software code provider can open the prover's software code in the TEE for review since there is no credential in the software code. By reviewing the software code, everyone knows that the software code does not leak the private keys or the plaintext. Remote attestation can guarantee that the software code running in the TEE is actually the software code that is reviewed.

An alternative to the disclosed systems and methods is the Zero-Knowledge-Proof (ZKP). However, in ZKP, to prove certain properties of plaintext, a ZKP protocol must be constructed specifically for that purpose. The construction of ZKP protocol requires mathematic background and some subtle skill. However, the disclosed methods and systems are general, which means that, to prove certain properties of plaintext, one just needs to write corresponding code in the TEE. Furthermore, as compared with ZKP, the disclosed systems and methods can prove more kinds of properties of plaintext. In contrast, not all properties can be proved by ZKP. However, as long as the proof can be generated by a Turing machine, the disclosed systems and methods can be applied to securely prove it.

Additionally, as compared with ZKP, the disclosed methods and system have better efficiency. Typically, the ZKP method is based on large amounts of public key crypto computation. However, the efficiency of performing large amounts of public key crypto computation is very poor. In contrast, for the disclosed systems and methods, the only extra cost is the cost of getting in and out the TEE. This context switching cost is far less than a series of public key crypto computations. If one considers the interactive ZKP, which involves several rounds of network communication, the disclosed systems and methods performance advantage is even larger than ZKP.

Additionally, the security of the disclosed systems and methods is reduced to the well-established technology of TEE. The security of the disclosed systems and methods is reduced to the security of the TEE, which has been well-studied for years.

FIG. 1 is a logical block diagram of a system 100 illustrating a scenario in which a property of plaintext of ciphertext needs to be verified. The system 100 is an example of the need of verifying a transaction value (e.g., plaintext) of a transaction using an RPoC on blockchain as an example. Below, an embodiment will be illustrated that shows how to use a TEE in solving the VEP described here.

However, the disclosed systems and methods are not limited to cryptocurrency transactions executed using a decentralized network in which transactions are using a blockchain 110, but may be used to verify a property of plaintext of any ciphertext.

The system 100 includes two users, Alice 102 and Bob 104, a verifier 106, and an auditor 108. Consider the following scenario. Alice 102 and Bob 104 are on the same blockchain, which is a list of records managed by a decentralized network. This decentralized network manages the privacy-preserving blockchain. This means that all the transactions and account balances are encrypted. Alice 102 wants to send $10 to Bob 104 through this decentralized network. This transaction, T 112, is encrypted the same as other transactions on the blockchain managed by the decentralized network. The verifier 106 one peer computing device on the decentralized network, has to be able to verify this transaction T 112. That is, at operation 114, the verifier 106 has to verify T 112, that the amount transferred from Alice 102 to Bob 104 is greater than zero, that Alice 102 has enough balance to transfer a transaction value (e.g., $10 of a cryptocurrency) to Bob 104. However, in conventional methods, the verification process 114 verifying the plaintext (e.g., that the amount transferred from Alice 102 to Bob 104 is greater than zero and that Alice 102 has sufficient funds in her account to transfer the transaction value of $10) has to be performed over the ciphertext without decrypting the ciphertext because the verifier 106 does not have the decryption key. The verifier 106 appends, at operation 116, the verification transaction (Txn) to the blockchain 110. The verification is audited, at operation 118, by the auditor 108.

Figure 2A:
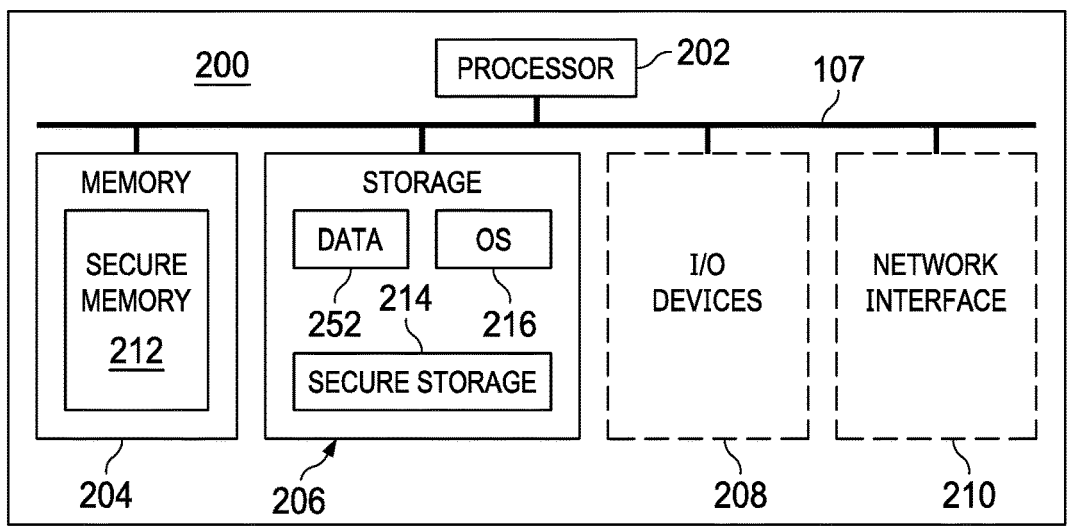
FIG. 2A illustrates, in a schematic diagram, an example of a computing device in accordance with an embodiment of the present disclosure.

FIG. 2A illustrates, in a schematic diagram, an example of a computing device 200 in accordance with an embodiment of the present disclosure. Computing device 200 may be, for example, a smart phone, tablet computer, personal computer such as a notebook computer, wearable computing device, Internet of Things (IoT) device, or the like.

Computing device 200 includes several components, including a processor 202, memory 204, storage 206, and a bus 207 to connect the components of computing device 202. Computing device 200 may also include additional components, such as one or more input/output (I/O) devices 208 and one or more network interface 210 (shown in dashed lines) Components of computing device 200 may be formed in one or more semiconductor chips, mounted to a printed circuit board for communication between components. In some embodiments, multiple components, e.g., processor 202 and network interface 210 are incorporated in a single semiconductor chip, referred to as a system-on-chip. In other embodiments, each component is a discrete chip.

Processor 202 is any suitable type of processor, such as a processor implementing an ARM or x86 instruction set.

Memory 204 is any suitable type of random-access memory accessible by processor 202. Memory 204 includes a secure memory 212. In some embodiments, secure memory 212 is a discrete physical module. In other embodiments, memory 204 is segmented to define secure memory within the same physical module as other memory. In some embodiments, secure memory 212 occupies a range of memory addresses within an address space of memory 204. In some embodiments, secure memory 212 is accessible by processor 202 within a different memory space.

Storage 206 may be, for example, one or more NAND flash memory modules of suitable capacity, or may be one or more persistent computer storage devices, such as a hard disk drive, a solid state drive, and the like. Storage 206 includes a secure storage 214. In some embodiments, secure storage 214 resides on a device shared with other storage 206. In other embodiments, secure storage 214 resides on a discrete hard drive, flash storage or the like.

Bus 207 may be one or more of any type of several bus architectures including a memory bus or memory controller, and a peripheral bus.

I/O devices 208 include, for example, user interface devices such as a capacitive or resistive touch-sensitive screen capable of receiving input in the form of touches, or a touch screen display with integrated touch sensors configured to receive input when touches on the touch screen display are detected and to render images thereon as output. In some embodiments, I/O devices 208 additionally or alternatively includes one or more of speakers, microphones, sensors such as accelerometers and global positioning system (GPS) receivers, keypads, a touchpad, or the like. In some embodiments, I/O devices 208 include ports for connecting computing device 200 to other computing devices. In an example, I/O devices 208 include a universal serial bus (USB) controller for connecting the computing device 200 to peripherals or to host computing devices.

Network interface 210 is capable of connecting computing device 200 to one or more communication networks. In some embodiments, network interface 210 includes one or more wireless radios, such as WI-FI® or cellular (e.g. GPRS, GSM, EDGE, CDMA, LTE or the like) for wirelessly connecting computing device 200 to a wireless communication network.

Computing device 200 operates under control of software programs including an operating system (OS) 216. Computer-readable instructions of software programs are stored in storage 206 or secure storage 214, and executed by processor 202 in memory 204 or secure memory 212.

Figure 2B:
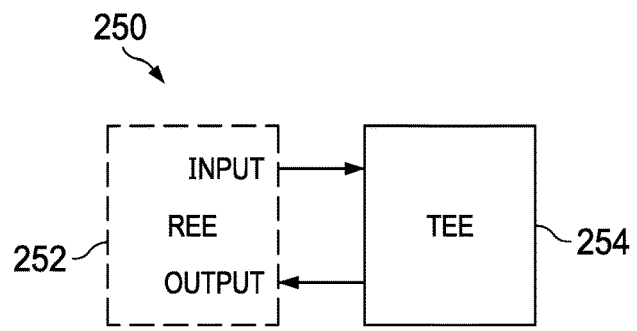
FIG. 2B shows embodiments of a trusted execution environment (TEE)

Computing device 200 includes or is configured to provide a plurality of distinct execution environments as shown in FIG. 2B. Different execution environments may be provided access to different storage and processing resources. The isolation of these environments can be enforced using software or hardware. In some embodiments, one of the environments may be referred to as trusted execution environment (TEE) and may have access to isolated and secure storage and processing resources. In some embodiments, one of the environments may be referred to as a rich execution environment (REE), which includes a user-facing OS. The TEE is more secure than the REE. The REE and the TEE may communicate with each other.

The resources allocated to the TEE can include separate processors (for example a single core in a multi-core processor may be allocated to the TEE) and isolated storage (in addition to registers associated with the isolated core, a distinct memory address range can be dedicated to the use of such a processor or co-processor allocated to the TEE). This TEE environment may support a distinct operating system, or it may be a set of secure resources accessible to applications that are assigned to use it by the underlying operating system (e.g., OS 216) of the overall system. In some embodiments, a dedicated secure storage resource, such as secure storage 214 within a general storage resource (e.g., storage 206) and a dedicated secure memory, such as secure memory 212, within the general memory resource (e.g., memory 204) may be present. Those skilled in the art that in some embodiments these secure resources may be at least one of physically and logically distinct from the general resources of the same type. As noted above, in a multi-core processor, one or more of the cores may be dedicated to one or more TEEs. In other embodiments, a co-processor external to processor 202 may provide the secure processing resources for the TEE.

FIG. 2B shows embodiments of a trusted execution environment TEE 254 and an REE 252 of the computing device 200. In an embodiment, the REE 252 includes a user-facing operating system. Although the TEE 254 has full access to the processor 202 and memory 204, the TEE 254 is hardware isolated from the other components of the computing device 200 which protects that TEE 254 from being accessed by user installed applications running in a main operating system of the computing device 200. The TEE 254 may be considered as a black box with an input from and an output to the REE 252. The TEE 254 has the following properties: 1) from the outside (e.g., REE 252), no one can see the data and the code inside the TEE 254; and 2) from the outside (e.g., REE 252), no one can change the data and the code inside the TEE 254. These two properties are hardware guaranteed, which means that only if an attacker can break the hardware can the attacker break the TEE 254 and access the data and code inside the TEE 254. Examples of a TEE 254 include the ARM® Trust Zone® and Intel® SGX.

Figure 3:
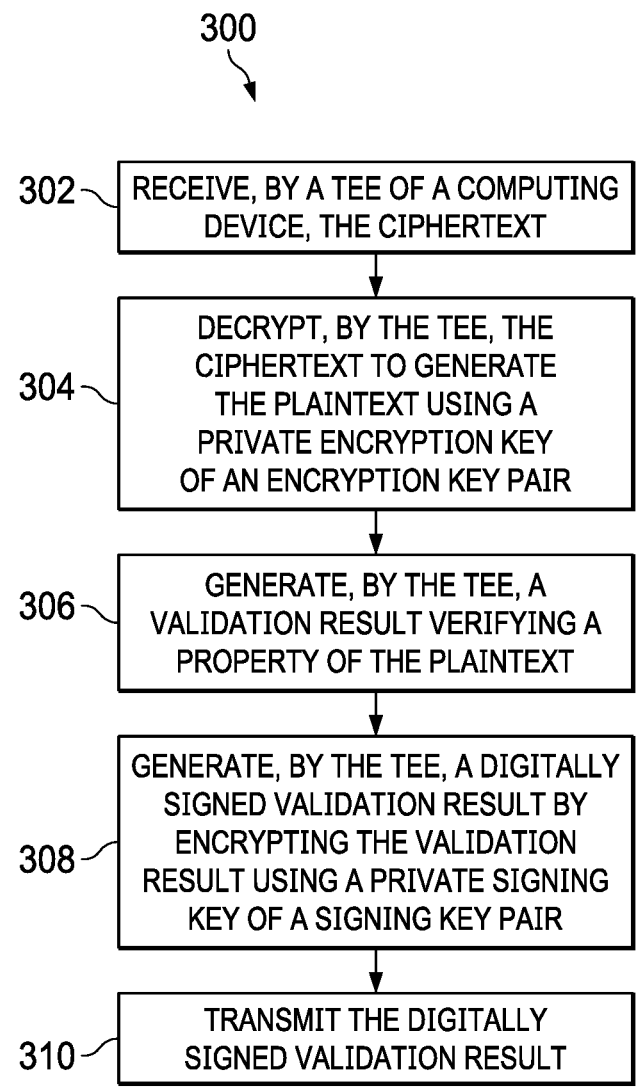
FIG. 3 shows a flowchart of a method for verifying a property of plaintext using ciphertext, in accordance with some embodiments.

FIG. 3 shows a flowchart of a method 300 for verifying a property of plaintext using ciphertext, in accordance with some embodiments. The method 300 may be carried out or performed by hardware of a computing device, such as the computing device 200 in FIG. 2A. The method 300 may also be carried out or performed by routines, subroutines, or modules of software executed by one or more processors of the computing device. The method 300 may further be carried out or performed by a combination of hardware and software. Coding of the software for carrying out or performing the method 300 is well within the scope of a person of ordinary skill in the art having regard to the present disclosure. The method 300 may include additional or fewer operations than those shown and described and may be carried out or performed in a different order. Computer-readable code or instructions of the software executable by the one or more processor of the computing device may be stored on a non-transitory computer-readable medium, such as for example, memory of the computing device.

A part of the operations in method 300 may be performed by the TEE of the computing device, such as the TEE 254 in FIG. 2B. Instructions corresponding to the part of the operations performed by the TEE may only be stored in a secure storage of the computer-readable medium, such as the secure storage 214 of the computing device in FIG. 2. In so doing, except the TEE, no other components inside the computing device or any other external devices, may execute the instructions corresponding to the part of the operations performed by the TEE in method 300. Further, as explained in detail below, some data generated by the TEE may only be stored in the secure storage of the computer-readable medium, which is only accessible by the TEE.

Method 300 starts at operation 302, where the TEE (e.g., TEE 254) of the computing device may receive the ciphertext. A public encryption key of an encryption key pair may be used to encrypt the plaintext to generate the ciphertext. The encryption key pair may comprise a public encryption key and the private encryption key.

At operation 304, the TEE may decrypt the ciphertext to generate the plaintext using the private encryption key of the encryption key pair. In one embodiment, the REE of the computing device may provide the encryption key pair to the TEE.

At operation 306, the TEE may generate a validation result based on the plaintext decrypted from the ciphertext. The validation result may verify a property of the plaintext. In some embodiments, the plaintext may be a numerical value, and the validation result may verify a property of the plaintext that the numerical value is within a range. In other embodiments, the plaintext may be a string, and the validation result may verify the property of the plaintext string, which may be a length of the string. In still other embodiments, the plaintext may be a hash value, and the validation result may verify the property of the plaintext that the hash value equals a certain value.

At operation 308, the TEE may generate a digitally signed validation result by encrypting the validation result using a private signing key of a signing key pair. The signing key pair may comprise a public signing key and the private signing key. In one embodiment, the TEE may generate and store the signing key pair. The private signing key of the signing key pair may be stored and retrieved from secure memory (e.g., secure storage 214) of the computing device. The secure memory may only be accessible by the TEE.

At operation 310, the computing device transmits the digitally signed validation result. The transmitted digitally signed validation result may enable a recipient to confirm the property of the plaintext by verifying the digitally signed validation result using the public signing key of the signing key pair. In one embodiment, the computing device may transmit the ciphertext and the digitally signed validation result to the recipient.

In one embodiment, the TEE may obtain the encryption key pair and generate the signing key pair. The TEE may receive an attestation certificate from a register server. The attestation certificate may verify that code executed by the TEE for verifying the property of the plaintext is correct.

In one embodiment, the REE of the computing device provides the encryption key pair to the TEE. The TEE generates the signing key pair and stores the private signing key in the secure memory of the computing device. The TEE may transmit a remote attestation request to a register server. The TEE may also transmit the public encryption key and the public signing key in a certificate request to the register server. The TEE may receive an address proof request and transmit to the register server an address proof response based on the private encryption key and the address proof request. The TEE may receive an attestation certificate generated by a secure element within the register server. The secure element may comprise a secret key that cannot be read from outside the secure element. The attestation certificate may verify that code executed by the TEE for verifying the property of the plaintext is correct. The attestation certificate may comprise the public signing key.

In one embodiment, the encryption key pair may comprise a Paillier key pair. The signing key pair may comprise one of a Rivest-Shamir-Adleman (RSA) key pair, or an Elliptic Curve Digital Signature Algorithm (ECDSA) key pair.

In one embodiment, the ciphertext may comprise an encrypted transaction value of a cryptocurrency transaction over a peer-to-peer network using blockchain. The property of the plaintext may be a range of the transaction value. The received ciphertext may be encrypted using an additive homomorphic encryption algorithm.

In one embodiment, the ciphertext may be an encrypted string, and the property of the plaintext may be a string length of the plaintext. In another embodiment, the ciphertext may be a hash value of the plaintext, and the property of the plaintext may be the hash value equaling a certain value.

Figure 4:
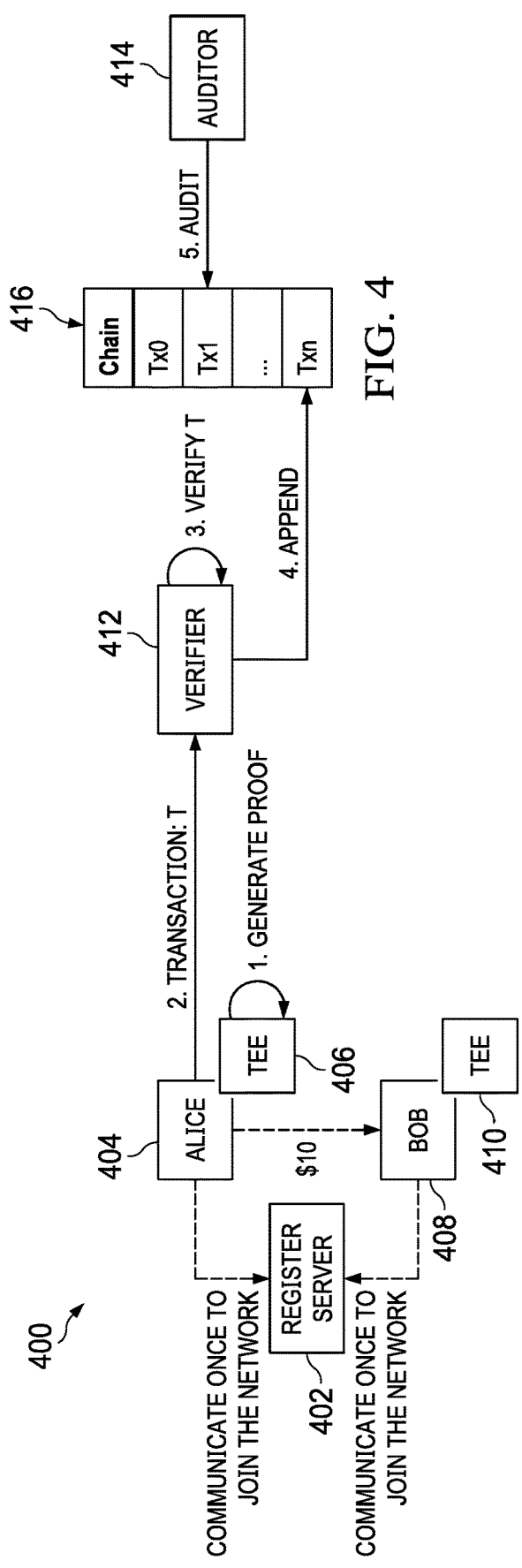
FIG. 4 is a block diagram of an embodiment of a system illustrating verifying the plaintext of ciphertext without decrypting the ciphertext in accordance with an embodiment.

FIG. 4 is a block diagram of an embodiment of a system 400 illustrating verifying a property of plaintext using ciphertext in accordance with the present disclosure. The system 400 includes computing devices associated with users Alice 404 and Bob 408, a verifier 412, an auditor 414, and a register server 402. The system 400 is similar to the system 100 depicted in FIG. 1 except that system 400 also includes a register server 402. The computing devices associated with users Alice 404 and Bob 408 each include a respective TEE 406, 410. The disclosed verifying of the property of the plaintext using ciphertext can be separated into three steps. The first step is to initialize the register server 402 and provision a secret for signing certificates to the register server. This process happens only once when setting up the decentralized network for managing the blockchain. The second step is to register a peer. The register server 402 issues certificates to a newly added peer (e.g., Alice 404, or Bob 406). This process happens only once for each peer when the peer joins the network for the first time. The third step is to broadcast a transaction. A peer computing device (e.g., Alice 404, or Bob 406) generates one transaction and broadcasts the transaction to the other peer computing device (e.g., Alice 404, or Bob 406) of the decentralized network together with the proof generated inside the peer's TEE (e.g., TEE 406, or TEE 410). Each of these three steps is described in more detail below.

Figure 5:
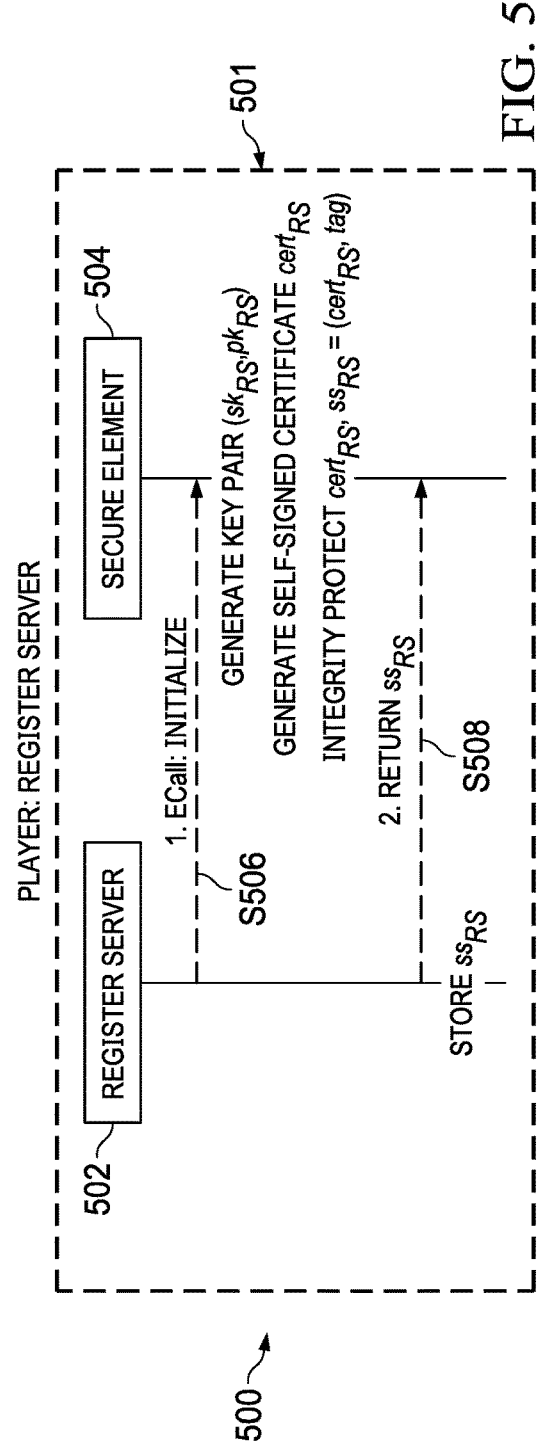
FIG. 5 is a diagram of an embodiment of a method for register server initialization.

FIG. 5 is a diagram of an embodiment of a method 500 for register server initialization. In an embodiment, the register server 501 includes a non-secure element (NSE) register server part 502 (e.g., an REE) and a secure element 504. In an embodiment, the secure element 504 is secure hardware. The secret in the secure element 504 can be used only inside the secure element 504. The secret cannot be read out of the secure element 504. The NSE register server 502 initiates an ECall S506 to the secure element 504 to generate a public-private key pair, such as a Rivest-Shamir-Adleman (RSA) key pair. The secure element 504 generates an RSA key pair (i.e., a private key, $sk_{RS}$ and a public key $pk_{RS}$) inside the secure element 504 and issues a self-signed certificate, $cert_{RS}$, to itself. The private key, $sk_{RS}$, will be used to issue certificates to new peers and the self-signed certificate, $cert_{RS}$, will be the root certificate. The self-signed certificate, $cert_{RS}$, is integrity-protected by a key, $ss_{RS}=(cert_{RS},tag)$ inside the secure element 504. The tag is a piece of data that protects the integrity of $cert_{RS}$. Any change to $cert_{RS}$ can be detected by verifying tag. The key protecting the integrity of the self-signed certificate, $cert_{RS}$, can be either an asymmetric key or a symmetric key. One reason that the self-signed certificate, $cert_{RS}$, is integrity-protected by a key is that the self-signed signature, $cert_{RS}$, cannot protect the integrity of the certificate. The secure element 504 returns S508 the integrity protected self-signed digital certificate, $ss_{RS}$, to the NSE register server 502 which stores the $ss_{RS}$.

Figure 6A:
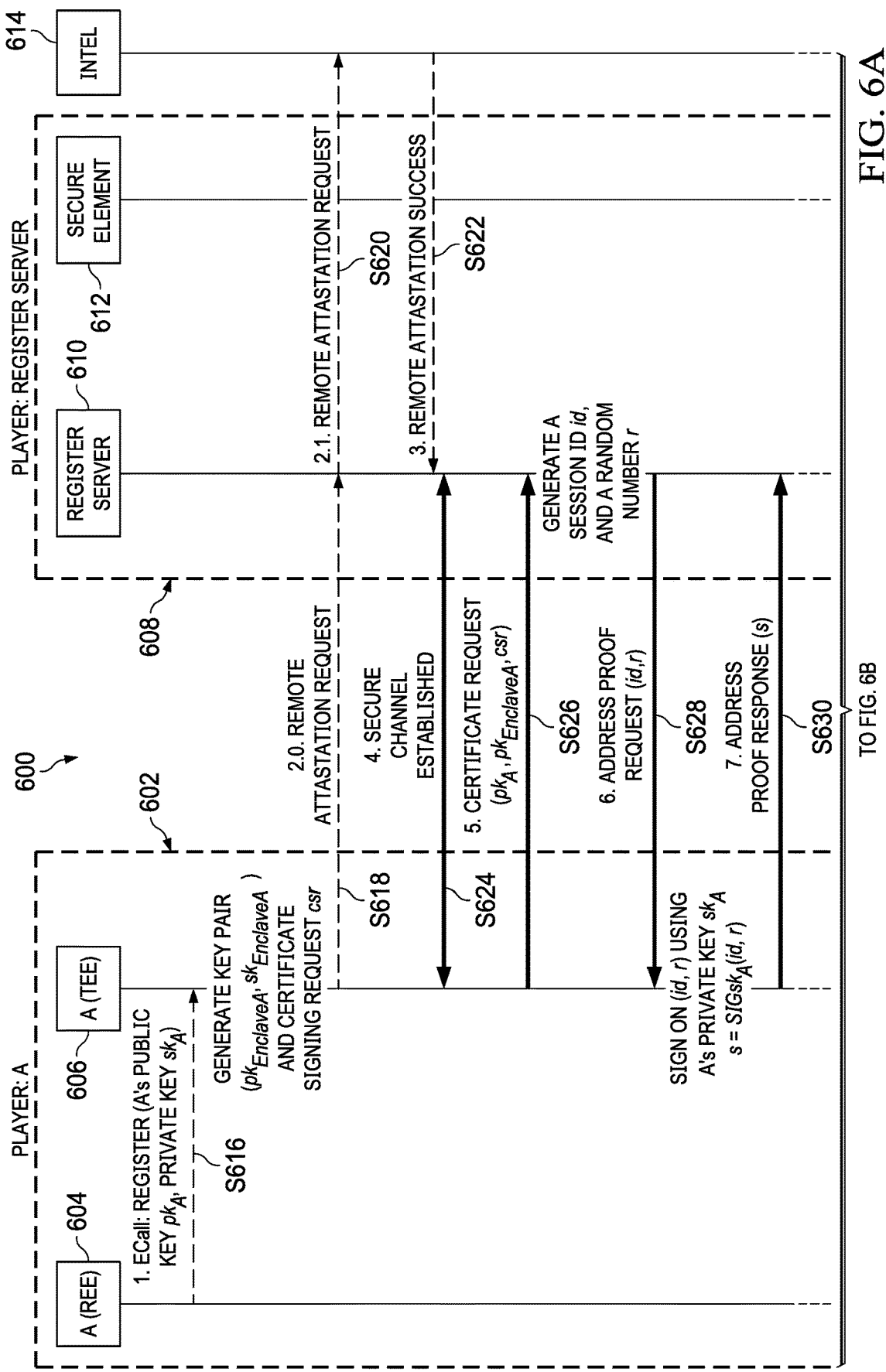
FIGS. 6A and 6B show a diagram of an embodiment of a method for registering a new peer.
Figure 6B:
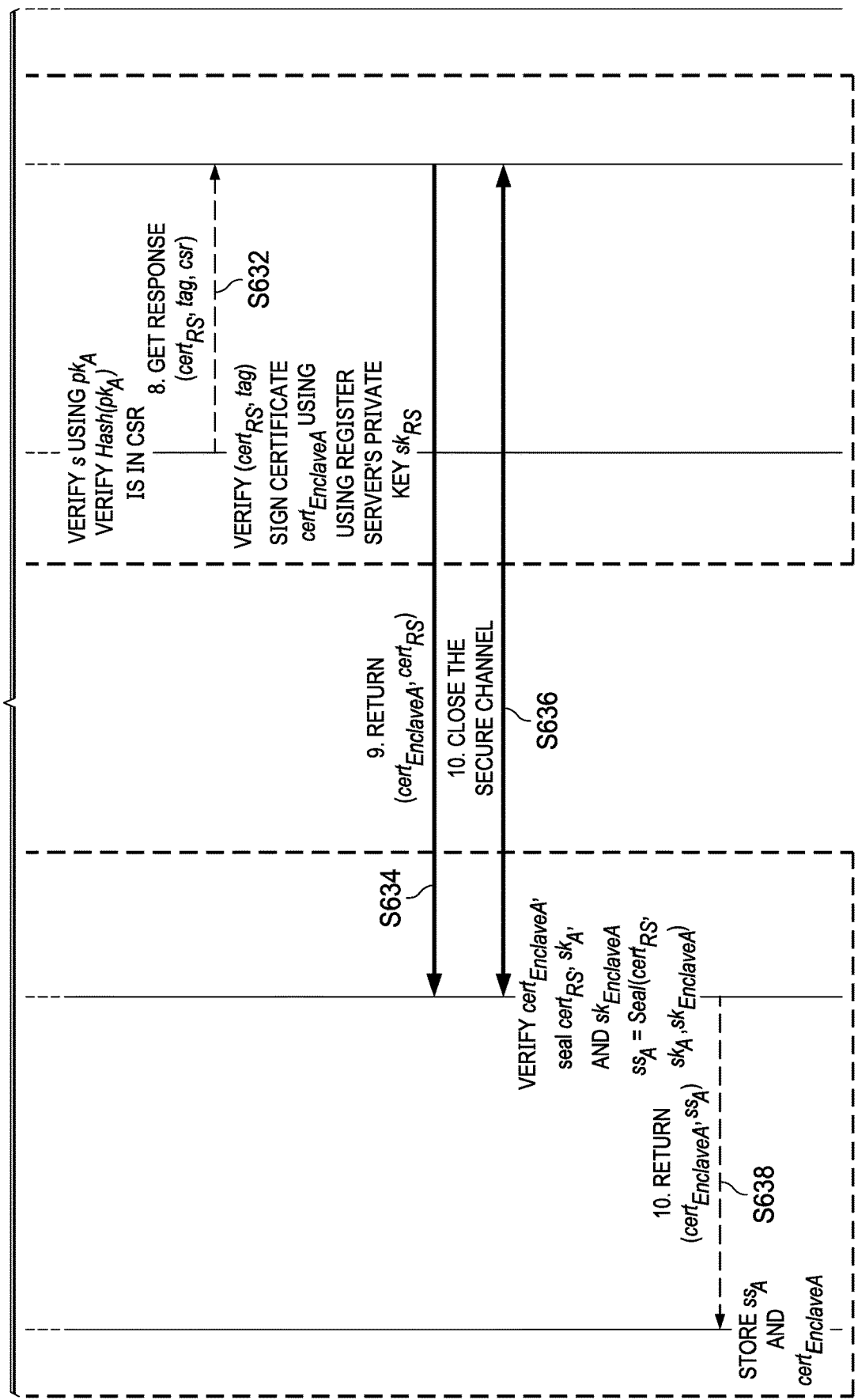

FIGS. 6A and 6B show a diagram of an embodiment of a method 600 for registering a new peer computing device in the decentralized network. The method 600 includes remote attestation. Remote attestation is a method that one can use to verify whether the code running in a TEE on the remote side of the new peer's computing device is the correct code or not. It is an authentication process of the code running TEE. The method 600 includes exchanging messages between a new peer's computing device 602 and a register server 608. The peer computing device 602 (referred to hereinafter as peer 602) includes an REE 604 and a TEE 606 as described above. The register server 608 includes an NSE register server 610 and a secure element 612.

The method 600 begins at step S616 where the REE 604 register's the peer's 602 public key, $pk_A$, and private key, $sk_A$, with the TEE 606. The TEE 606 generates a key pair $(pk_{EnclaveA}, sk_{EnclaveA})$ and a certificate signing request. The private key, $sk_{EnclaveA}$, will never leave the TEE. The purpose of this key pair $(pk_{EnclaveA}, sk_{EnclaveA})$ is for signing a proof after a transaction is verified inside the TEE. At step S618, the TEE 606 transmits a remote attestation request to the NSE register server 610. At step S620, the NSE register server 610 transmits a remote attestation request (corresponding to the request received from the peer 602) to the manufacture 614 of the processor of the peer's 602, which may be, but is not limited to, for example, Intel™. The manufacture 614 performs the remote attestation. TEE 606 collects the evidence (called quote technically) and sends it to the manufacturer of the processor 614 (hereinafter manufacturer 614). By verifying the quote, the manufacturer 614 proves that the TEE 606 is actually the one correct TEE 606. Intel 614 returns the attestation report to the register server 610. The quote contains the information of the public key, and the information will eventually go into the report returned by the manufacturer 614. By verifying the manufacturer's report, the register server 610 knows that it is communicating with the correct TEE 606 and the private key corresponding to the public key is generated and protected by the TEE 606. At step S622, the manufacturer 614 transmits a remote attestation success message to the register server 610. At step S624, a secure channel is established between the NSE register server 610 and the TEE 606. At step S626, the TEE 606 transmits a certificate request including the two public keys, $pk_A$ and $pk_{EnclaveA}$, to the NSE register server 610 through the secure channel for the purpose of integrity protection. In response to the certificate request, the NSE register server 610 generates a session ID, id, and a random number, r. At step S628, the NSE register server 610 sends an address proof request that includes the Session ID, id, and the random number, r, to the TEE 606. In response to the address proof request, the NSE register server 610 generates an address proof response, s, using A's private key, $sk_A$, and the id and r, where $s=Sig_{sk_A}(id, r)$. $Sig_{sk_A}(id, r)$ is an algorithm used to generate a digital signature. At step S630, the TEE 606 sends the address proof response, s, to the NSE register server 610. In response to the receipt of the address proof response, s, the NSE register server 610 verifies s using $pk_A$ by verifying that $Hash(pk_A)$ is in the certificate signing request (csr). If an entity wishes to apply for a certificate from a CA, the entity generates a csr and sends it to the CA. The CA verifies the information in the csr and generates a certificate based on the csr. At step S632, the NSE register server 610 sends a get response message to the secure element 612. The get response message includes the $cert_{RS}$, tag, and csr. The secure element 612 verifies the $cert_{RS}$ and tag. The secure element 612 also signs the certificate, $cert_{EnclaveA}$, using the register server's private key, $sk_{RS}$. At step S634 the secure element 612 returns the signed certificate, $cert_{EnclaveA}$, and the $cert_{RS}$ to the TEE 606. At step S636, the secure channel is closed. The TEE 606 verifies the $cert_{EnclaveA}$ and seals the $cert_{RS}$, $sk_{RS}$, and $sk_{EnclaveA}$. The TEE 606 determines an $ss_A$ according to $ss_A=Seal(cert_{RS}, sk_A, sk_{EnclaveA})$. At step S638, the TEE 606 returns the $cert_{EnclaveA}$ and the $ss_A$ to the REE 604. The REE 604 stores the $cert_{EnclaveA}$ and the $ss_A$.

Figure 7A:
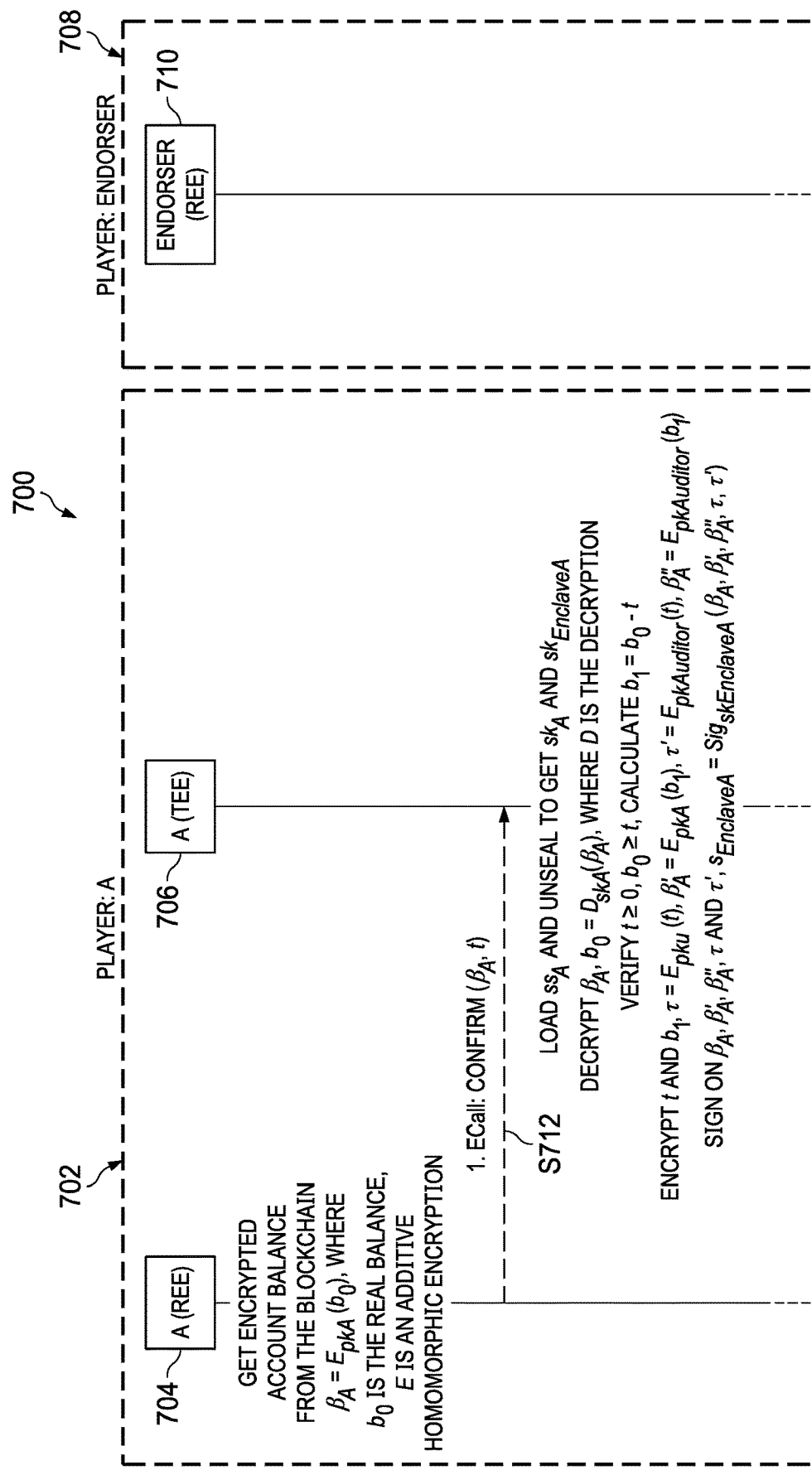
FIGS. 7A and 7B show a diagram of an embodiment of a method to validate a transaction containing encrypted data.
Figure 7B:
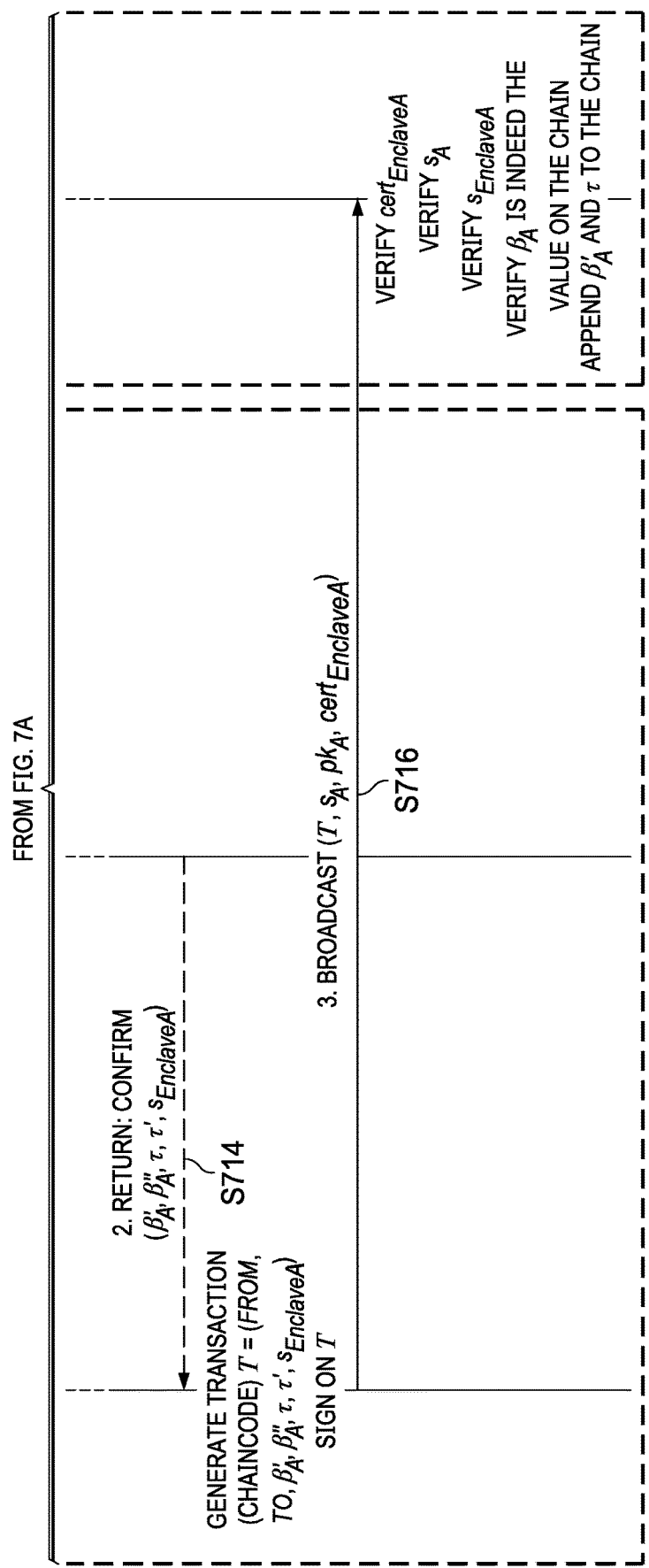

FIGS. 7A and 7B show a diagram of an embodiment of a method 700 to validate a property of plaintext using ciphertext in accordance with the present disclosure, in which the plaintext is a cryptocurrency transaction value and the property to be verified is that the cryptocurrency transaction value is within a given range. The method 700 describes the message flow between the REE 704 and the TEE 706 of a computing device 702 (hereinafter referred to as device 702) and the message flow between the device 702 and an endorser 708. Endorser 708 may be associated with the same or a different computing device as device 702. In the depicted example, the transaction includes a transaction value that is to be transferred from the computing device 702 to another computing device. However, the disclosed method 700 may be applied to other types of transactions and is not limited to cryptocurrency transactions. In this example, the ciphertext is the encrypted transaction value which is decrypted using the private encryption key $sk_A$ of the encryption key pair. The private encryption key $sk_A$ is stored in secure memory of the computing device 702 that is only accessible by the TEE 706. Since the decryption happens in the TEE 706, the private encryption key or the plaintext is not accessible by the REE 706 or any other third party. The validation result is digitally signed by the private signing key of the signing key pair that is stored in secure memory of the computing device 702 and only accessible by the TEE 706. Therefore, a verifier can simply verify the digitally signature using the signing public key of the signing key pair to confirm the validation result and hence the property of the transaction value (e.g., that the transaction value is within a certain range).

The method 700 begins with the REE 704 of the device 702(e.g., the party transferring money) obtaining the encrypted account balance, $\beta_A$. The encrypted balance, $\beta_A$, is given by the expression $\beta_A = E_{pk_A}(b_0)$ where $b_0$ is the real balance and E is an additive homomorphic encryption. At step S712, the REE 704 sends a call to the TEE 706 to confirm that the real balance, $b_0$, is greater than the amount to be transferred, t. The TEE 706 loads $ss_A$ and unseals the $ss_A$ to get the $s_{kA}$ and the $sk_{EnclaveA}$. The TEE 706 decrypts $\beta_A$, $b_o = D_{skA}(\beta_A)$, where D is the decryption that verifies that $t \geq 0$ and that $b_o \geq t$. In an aspect, the TEE 706 calculates $b_1 = b_o - t$. At step S714, the TEE 706 returns $\beta'_A$, $\beta''_A$, $\tau, \tau'$, and $S_{EnclaveA}$ to the REE 704. $\beta'_A$ is A's 702 new account balance encrypted by A's public encryption key. $\beta''_A$ is A's 702 new balance encrypted by auditor's public encryption key. $\tau$ is the transaction amount encrypted by B's public encryption key. $\tau'$ is the transaction amount encrypted by the auditor's public encryption key. $S_{EnclaveA}$ is the signature of the message using the signing private key of the signing key pair. The REE 704 generates a transaction chaincode, T, where T=(From,$T_0$o, $\beta'_A$, $\beta''_A$, $\tau$, $\tau'$, SEnclaveA). The REE 704 then signs on T. At step 716, the REE 704 broadcasts T, $s_A$, $pk_A$, and $cert_{EnclaveA}$ to the endorser REE 708. The endorser REE 704 verifies $cert_{EnclaveA}$, verifies $s_A$, verifies $s_{EnclaveA}$, and verifies that $\beta_A$ is indeed the value on the blockchain. The endorser REE 708 verifies $s_A$ to make sure this transaction is sent by A. The endorser REE 708 verifies $cert_{EnclaveA}$ to make sure the public signing key in the certificate belongs to enclave A. The endorser REE 708 verifies $s_{EnclaveA}$ to make sure the transaction is generated in TEE 706, which is trusted. Once the endorser 708 makes these verifications, the endorser can trust the data in the certificate. Then, the endorser REE 708 appends $\beta'_A$ and $\tau$ to the blockchain. The encrypted account balance is decrypted by the private key $sk_A$ of the encryption key pair, which is received by the TEE 706. Since the decryption happens in the TEE 706, the private key or the plaintext is inaccessible to outside malicious third parties. The validation result is signed by the signing private key of the signing key pair in the TEE 706. The signing private key is never exposed to the outside. Therefore, the verifier can simply verify the signature to confirm the validation of the transaction.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by other units or modules. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

The disclosed methods and systems provide a generalized technique of using ciphertext to verify properties of plaintext, such as a numerical value being within a range, a string length, and a hash value equaling a certain value. These described examples of plaintext properties are for illustration purpose. The generalized technique described in this disclosure is applicable to verifying any other types of properties of plaintext using ciphertext.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for verifying a property of plaintext using ciphertext, the method comprising:
   receiving, by a trusted execution environment (TEE) of a computing device, the ciphertext;
   decrypting, by the TEE, the ciphertext to generate the plaintext using a private encryption key of an encryption key pair comprising a public encryption key and the private encryption key;
   generating, by the TEE, a validation result verifying a property of the plaintext;
   generating, by the TEE, a digitally signed validation result by encrypting the validation result using a private signing key of a signing key pair comprising a public signing key and the private signing key, the private signing key retrieved from secure memory of the computing device, the secure memory being only accessible by the TEE; and
   transmitting, by the computing device, the ciphertext and the digitally signed validation result to a same recipient computing device, the private encryption key in the secure memory only accessible by the TEE of the computing device and inaccessible by the recipient computing device.

2. The method of claim 1, wherein the transmitted digitally signed validation result enables the recipient computing device to confirm the property of the plaintext by verifying the digitally signed validation result using the public signing key.

3. The method of claim 1, further comprising:
obtaining, by the TEE, the encryption key pair;
generating, by the TEE, the signing key pair; and
receiving, by the TEE, an attestation certificate from a register server, the attestation certificate verifying that code executed by the TEE for verifying the property of the plaintext is correct.

4. The method of claim 1, further comprising:
providing, by a rich execution environment (REE) of the computing device to the TEE, the encryption key pair;
generating, by the TEE, the signing key pair and storing the private signing key in the secure memory of the computing device;
transmitting, by the TEE to a register server, a remote attestation request;
transmitting, by the TEE via a secure channel established between the TEE and the register server, the public encryption key and the public signing key in a certificate request;
receiving, by the TEE from the register server, an address proof request;
transmitting, by the TEE to the register server, an address proof response based on the private encryption key and the address proof request; and
receiving, by the TEE, an attestation certificate generated by a secure element within the register server, the secure element comprising a secret key that cannot be read from outside the secure element, wherein the attestation certificate verifies that code executed by the TEE for verifying the property of the plaintext is correct, and the attestation certificate comprising the public signing key.

5. The method of claim 1, wherein the encryption key pair comprises a Paillier key pair, and wherein the signing key pair comprises one of a Rivest-Shamir-Adleman (RSA) key pair, or an Elliptic Curve Digital Signature Algorithm (ECDSA) key pair.

6. The method of claim 1, wherein the ciphertext comprises an encrypted transaction value encrypted from a transaction value of a cryptocurrency transaction over a peer-to-peer network using blockchain, and wherein the property of the plaintext is a range of the transaction value.

7. The method of claim 1, wherein the received ciphertext is encrypted using an additive homomorphic encryption algorithm.

8. The method of claim 1, wherein the ciphertext is an encrypted string, and wherein the property of the plaintext is a string length of the plaintext.

9. The method of claim 1, wherein the ciphertext is a hash value of the plaintext, and wherein the property of the plaintext is the hash value equaling a certain value.

10. A computing device for verifying a property of plaintext using ciphertext, the computing device comprising:
a memory storage for storing instructions, the memory storage comprising secure memory and non-secure memory; and
one or more processors in communication with the memory storage, wherein the one or more processors execute the instructions to:
receive, by a trusted execution environment (TEE) of the computing device, the ciphertext;
decrypt, by the TEE, the ciphertext to generate the plaintext using a private encryption key of an encryption key pair comprising a public encryption key and the private encryption key;
generate, by the TEE, a validation result verifying a property of the plaintext;
generate, by the TEE, a digitally signed validation result by encrypting the validation result using a private signing key of a signing key pair comprising a public signing key and the private signing key, the private signing key retrieved from the secure memory of the computing device, the secure memory being only accessible by the TEE; and
transmit, by the computing device, the ciphertext and the digitally signed validation result to a same recipient computing device, the private encryption key in the secure memory only accessible by the TEE of the computing device and inaccessible by the recipient computing device.

11. The computing device of claim 10, wherein the transmitted digitally signed validation result enables a recipient to confirm the property of the plaintext by verifying the digitally signed validation result using the public signing key.

12. The computing device of claim 10, wherein the one or more processors further execute the instructions to:
obtain, by the TEE, the encryption key pair;
generate, by the TEE, the signing key pair; and
receive, by the TEE, an attestation certificate from a register server, the attestation certificate verifying that code executed by the TEE for verifying the property of the plaintext is correct.

13. The computing device of claim 10, wherein the one or more processors further execute the instructions to:
provide, by a rich execution environment (REE) of the computing device to the TEE, the encryption key pair;
generate, by the TEE, the signing key pair and storing the private signing key in the secure memory of the computing device;
transmit, by the TEE to a register server, a remote attestation request;
transmit, by the TEE via a secure channel established between the TEE and the register server, the public encryption key and the public signing key in a certificate request;
receive, by the TEE from the register server, an address proof request;
transmit, by the TEE to the register server, an address proof response based on the private encryption key and the address proof request; and
receive, by the TEE, an attestation certificate generated by a secure element within the register server, the secure element comprising a secret key that cannot be read from outside the secure element, wherein the attestation certificate verifies that code executed by the TEE for verifying the property of the plaintext is correct, and the attestation certificate comprising the public signing key.

14. The computing device of claim 10, wherein the encryption key pair comprises a Paillier key pair, and wherein the signing key pair comprises one of a Rivest-Shamir-Adleman (RSA) key pair, or an Elliptic Curve Digital Signature Algorithm (ECDSA) key pair.

15. The computing device of claim 10, wherein the ciphertext comprises an encrypted transaction value encrypted from a transaction value of a cryptocurrency transaction over a peer-to-peer network using blockchain, and wherein the property of the plaintext is a range of the transaction value.

16. The computing device of claim 10, wherein the received ciphertext is encrypted using an additive homomorphic encryption algorithm.

17. The computing device of claim 10, wherein the ciphertext is an encrypted string, and wherein the property of the plaintext is a string length of the plaintext.

18. The computing device of claim 10, wherein the ciphertext is a hash value of the plaintext, and wherein the property of the plaintext is the hash value equaling a certain value.

19. A computer-readable storage medium comprising secure memory and non-secure memory, the computer-readable storage medium having instructions stored thereon that, when executed by one or more processors of a computing device, cause the computing device to perform operations for verifying a property of plaintext using ciphertext, the operations comprising:

receiving, by a trusted execution environment (TEE) of the computing device, the ciphertext;

decrypting, by the TEE, the ciphertext to generate the plaintext using a private encryption key of an encryption key pair comprising a public encryption key and the private encryption key;

generating, by the TEE, a validation result verifying a property of the plaintext;

generating, by the TEE, a digitally signed validation result by encrypting the validation result using a private signing key of a signing key pair comprising a public signing key and the private signing key, the private signing key retrieved from the secure memory of the computing device, the secure memory being only accessible by the TEE; and transmitting, by the computing device, the ciphertext and the digitally signed validation result to a same recipient computing device, the private encryption key in the secure memory only accessible by the TEE of the computing device and inaccessible by the recipient computing device.

* * * * *